United States Patent [19]

Gregor et al.

[11] Patent Number: 4,972,156

[45] Date of Patent: Nov. 20, 1990

[54] PHASE CONJUGATE LASER WITH A TEMPORAL SQUARE PULSE

[75] Inventors: Eduard Gregor, Pacific Palisades; Alexander R. Muir, Playa Del Rey; James S. Sorce, Lawndale, all of Calif.

[73] Assignee: Hughes Aircraft Company, Los Angeles, Calif.

[21] Appl. No.: 372,503

[22] Filed: Jun. 28, 1989

[51] Int. Cl.$^5$ ............................ H01S 3/10; H01S 3/13
[52] U.S. Cl. ........................................ 330/4.3; 372/25
[58] Field of Search ...................... 372/21, 25, 30, 99; 330/4.3; 332/7.51; 455/608

[56] References Cited

U.S. PATENT DOCUMENTS

| | | | |
|---|---|---|---|
| 4,571,954 | 2/1986 | Roberts et al. | 372/99 |
| 4,642,582 | 2/1987 | O'Meara | 332/7.51 |
| 4,734,911 | 3/1988 | Bruesselbach | 330/4.3 |
| 4,791,644 | 12/1988 | Dube | 372/99 |

OTHER PUBLICATIONS

Kurmit et al.; "Application of . . . KrF Pulses"; IEEE J. Quant. Elec., vol. 25, #3, pp. 421–429, 3/89, Abst. only.

Primary Examiner—Nelson Moskowitz
Attorney, Agent, or Firm—William J. Steeter; Wanda K. Denson-Low

[57] ABSTRACT

A system and method for producing relatively square laser pulses derived from relatively Gaussian laser pulses. The system comprises a phase conjugate laser system that comprises a laser oscillator, an amplifying medium and a phase conjugate mirror having a nonlinear confined at a predetermined pressure. The mirror is adapted to truncate the front portion of an applied laser pulse. A plasma switch is disposed between the laser oscillator and the amplifying medium that has a gas confined therein at a predetermined pressure. The plasma switch and phase conjugate mirror cooperate to truncate the laser pulse to produce a laser pulse having a relatively square shape. Controlling the pressures in the plasma switch and phase conjugate mirror provides a means of controlling the formation of square-shaped laser pulses. In addition, a delay line may be employed in the system that is controllable in length that assists in controlling the truncation of the pulse in the plasma switch. A method of forming a square laser pulse in accordance with the invention comprises the following steps. A laser pulse is propagated through a plasma switch, and the pressure therein is adjusted to truncate the rear portion of the laser pulse. The truncated laser pulse is then transmitted through a laser amplifier medium to amplify the laser pulse. The amplified laser pulse is then reflected from a phase conjugate mirror. The pressure in the phase conjugate mirror is adjusted to a predetermined pressure to truncate the front portion of the laser pulse, thus producing a relatively square output pulse. Additionally, the relative length of a delay line disposed in the optical path may also be adjusted to assist in truncating the rear portion of the laser pulse.

13 Claims, 2 Drawing Sheets

4,972,156

PHASE CONJUGATE LASER WITH A TEMPORAL SQUARE PULSE

BACKGROUND

The present invention relates generally to phase conjugate lasers and more particularly to a phase conjugate laser that provides a relatively square temporal laser pulse derived from a generally Gaussian temporal laser pulse.

There are some laser applications that require the use of relatively square temporal laser pulses. Typically, conventional lasers generate Gaussian shaped laser pulses in time, and it has been necessary to create complex systems to generate square pulses therefrom. In particular, one common approach has been to employ the use of electro-optic polarization switches that cut a slice out of a relatively long oscillator pulse to produce the square pulse.

Typically, the configuration comprises two electro-optical crystals in series with each other along an optical path. Each crystal includes an electronic drive circuit and two polarizers. Such a conventional system is complex and costly. Such an approach is known to be employed at Lawrence Livermore National Laboratory in Livermore, Calif. Accordingly, it would be an improvement in the art to provide for a less complex and costly system that generates relatively square laser pulses.

SUMMARY OF THE INVENTION

The present invention provides for a system and method of producing relatively square laser pulses derived from relatively Gaussian laser pulses. The system of the present invention comprises a phase conjugate laser that comprises a laser oscillator, and a phase conjugate mirror having a nonlinear medium therein confined at a predetermined pressure that is adapted to truncate a predetermined front portion of an applied laser pulse. An amplifying medium is disposed between the laser oscillator and the phase conjugate mirror for amplifying an applied laser pulse. A plasma switch disposed between the laser oscillator and the amplifier that has a predetermined plasma confined therein at a predetermined pressure that is adapted to truncate a predetermined rear portion of the laser pulse to produce a laser pulse having a relatively square shape in time.

Generally, the relative pressures and the gas type employed in the phase conjugate mirror and plasma switch are determinative of the amount of truncation of the laser pulse transmitted from the oscillator to the phase conjugate mirror and back. Controlling the pressures and gas type provides one controlling factor that produces the laser pulses that have a relatively square shape. In addition, an optical delay line may be employed in the system that is controllable in length. The control of this delay line also assists in controlling the truncation of the pulse by the plasma switch.

The present invention also contemplates a method of forming a square laser pulse. The laser pulse is formed in a master oscillator power amplifier laser system, for example. The method comprises the following steps. A laser pulse is propagated through a plasma switch and an amplifier in order to amplify the laser pulse. The amplified laser pulse is then reflected from a phase conjugate mirror. The pressure in the phase conjugate mirror is adjusted to truncate the front portion of the pulse. The pressure in the plasma switch is then adjusted to a predetermined pressure to truncate the rear portion of the laser pulse. Additionally, the relative length of a delay line disposed between the amplifier and the phase conjugate mirror may also be adjusted to assist in truncating the rear portion of the laser pulse.

The phase conjugate mirror may comprise methane or nitrogen gas, or other suitable low grain stimulated Brillouin scattering medium. The pressure in the mirror is adjusted accordingly, based upon the nonlinear material employed therein, to a pressure of about 1000 pounds per square inch for methane, and a pressure of about 2000 pounds per square inch for nitrogen, for example.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
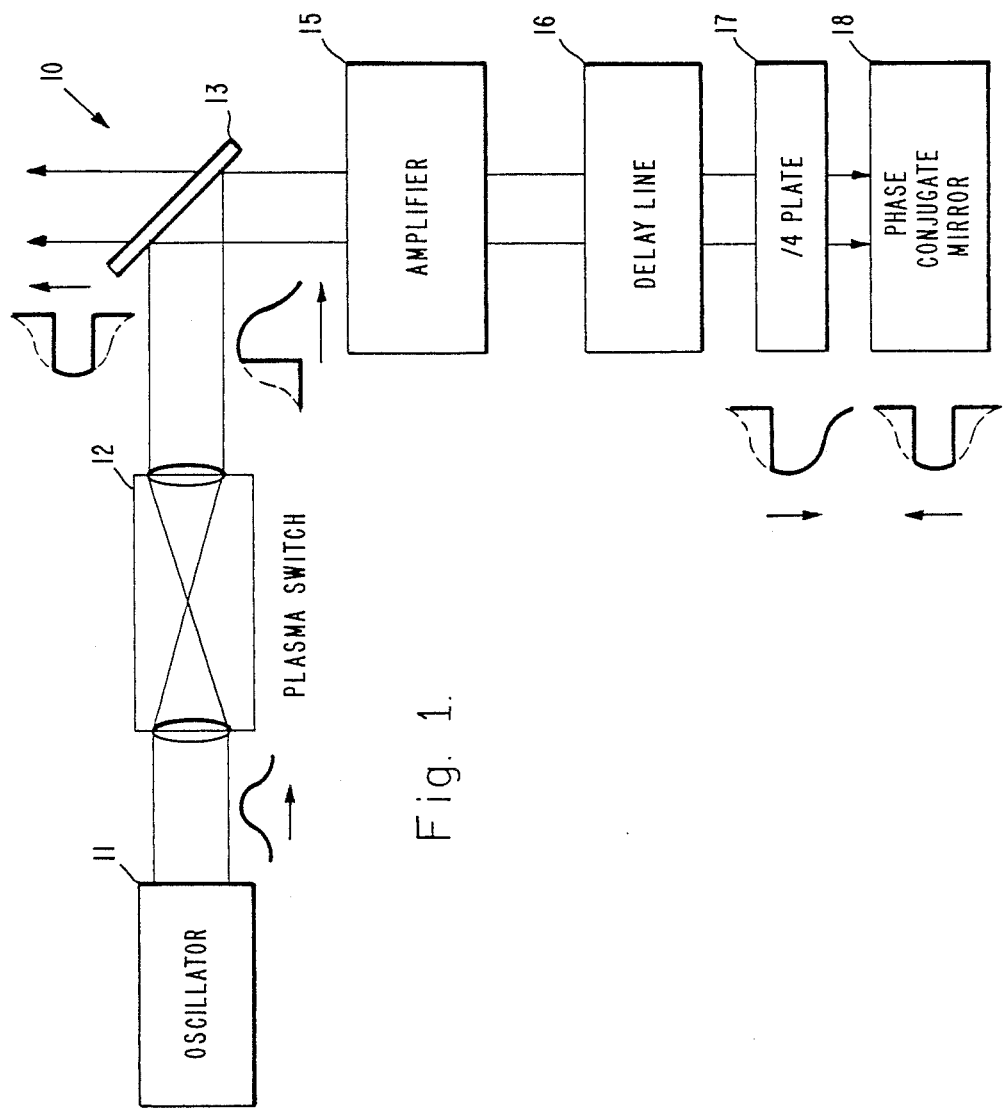
FIG. 1 is an illustration of a laser system in accordance with the principles of the present invention.

Referring FIG. 1, an illustration of a laser system 10 in accordance with the principles of the present invention is shown. The laser system 10 is configured as a master oscillator, power amplifier configuration, and in addition, is a phase conjugate laser system. The system 10 comprises a laser oscillator 11 that is adapted to provide a pulsed output along an optical path. The output pulse of the oscillator 11 is generally Gaussian in time. A plasma switch 12 is disposed along the optical path and is adapted to transmit applied laser pulses. The plasma switch is generally conventional in design, and generally contains a gas under pressure. Typical of such gasses are nitrogen and argon, for example. Typically, the plasma switch is operated in a pressure range of from 2 to 60 pounds per square inch, for example. In the present invention, the pressure is controllable and is adjusted to produce truncation of the Gaussian pulse as will be more fully described below.

An amplifier section comprises a polarizing beamsplitter 13, a laser amplifier 15, a controllable delay line 16, a quarter wave plate 17 and a phase conjugate mirror 18 disposed along the optical path. The polarizing beamsplitter 13, amplifier 15, and quarter wave plate 17 are conventional in design and will not be described in detail. The phase conjugate mirror 18 is a low gain nonlinear material, which may be a solid such as glass, or a gas, such as methane or nitrogen, for example. Such materials are generally well-known in the art. The present invention generally employs a gaseous nonlinear medium because of the ability to control the pressure within the phase conjugate mirror 18 that results in the truncation of the laser pulse by the present invention. The delay line 16 is controllable in length and this control assists in the truncation of the laser pulse by the plasma switch 12.

In operation, a relatively square output pulse is created from a generally Gaussian oscillator pulse. The Gaussian laser pulse from the oscillator 11 passes through the plasma switch 12, where its rear portion is clipped by the plasma created when the delayed amplified first part of the pulse is fed back and is superimposed on the outgoing oscillator pulse. The pulse is then reflected from the beamsplitter 13. The reflected pulse is amplified in the amplifier 15 and reflected from the phase conjugate mirror 18. The front portion of the Gaussian laser pulse is truncated or clipped by the phase conjugate mirror 18. This is accomplished by controlling the pressure of the gas employed as the nonlinear medium. In particular, the phase conjugate mirror 18 may incorporate methane or nitrogen, or other suitable low gain stimulated Brillouin scattering medium. The pressure in the mirror 18 is adjusted accordingly, based upon the nonlinear material employed therein, to a pressure of about 1000 pounds per square inch for methane, and a pressure of about 2000 pounds per square inch of nitrogen, for example.

The partially truncated laser pulse is then reamplified in the amplifier 15 during its second pass therethrough. By controlling the delay line length in the controllable delay line 17 and the pressure in the plasma switch 12, the rear portion of the clipped Gaussian pulse is truncated at a predetermined point in time when the plasma is generated to create a relatively square wave pulse. The plasma is generated when the electric field in the focus exceeds the plasma threshold. The electric field is formed by the fields from the outward going oscillator pulse and the inward going feedback from the amplified energy. The feedback represents a small portion (approximately 1%) of the total output that exits the system 10.

Figures 2A, 2B:
FIGS. 2a–2c are graphs illustrating the creation of the square shaped laser pulse by the system of FIG. 1.
Figure 2C:
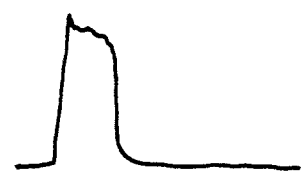

FIGS. 2a-2c show graphs illustrating the truncation of the Gaussian pulse by the system 10 of the present invention to produce a square pulse. FIGS. 2a-2c are representative of oscilloscope traces photographed during testing of the system 10 of FIG. 1. In particular, FIG. 2a shows the applied Gaussian pulse provided by the oscillator 11. FIG. 2b shows truncation of the front end of the Gaussian pulse by the phase conjugate mirror 18. FIG. 2c shows the final square pulse after truncation of the rear portion of the Gaussian pulse by the plasma switch 12.

Figure 3:
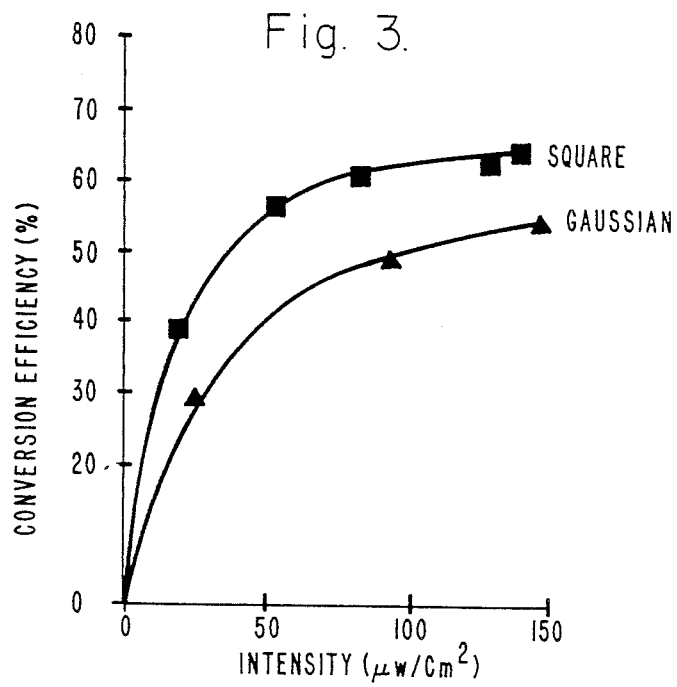
FIG. 3 is a graph illustrating the internal second harmonic conversion efficiency versus intensity for a normal Gaussian pulse and a square pulse produced by the system of FIG. 1.

All nonlinear processes, including harmonic generation, and vibrational and rotational Raman scattering are intensity dependent. The square pulse provided by the present invention produces a higher conversion efficiency when compared to a normal Gaussian pulse. This is shown graphically in FIG. 3, which is a graph illustrating the internal second harmonic conversion efficiency versus intensity for a normal Gaussian pulse and a square pulse produced by the system of FIG. 1.

In addition to the above-described system 10, the present invention contemplates a method of producing a square laser pulse. The method comprises the following steps. A laser pulse is propagated through a plasma switch and an amplifier in order to amplify the laser pulse. The amplified laser pulse is then reflected from a phase conjugate mirror. The pressure in the phase conjugate mirror is adjusted to truncate the front portion of the pulse. The pressure in the plasma switch is then adjusted to a predetermined pressure to truncate the rear portion of the laser pulse. Additionally, the relative length of a delay line disposed between the amplifier and the phase conjugate mirror may also be adjusted to assist in truncating the rear portion of the laser pulse.

Thus there has been disclosed a new and improved phase conjugate laser system and method that produces relatively square laser pulses derived from relatively Gaussian laser pulses. The present system and method provides for an improvement in the art that is less complex and less costly than conventional systems and methods that generates square laser pulses.

It is to be understood that the above-described embodiments are merely illustrative of some of the many specific embodiments which represent applications of the principles of the present invention. Clearly, numerous and other arrangements can be readily devised by those skilled in the art without departing from the scope of the invention. In particular, other system arrangements may be employed, and different gasses may be employed in the plasma switch and phase conjugate mirror, for example. In addition, solid or liquid nonlinear materials may also be employed by adapting those that are controllable to produce the desired pulse truncation.

What is claimed is:

1. A phase conjugate laser for providing a relatively square laser output pulse, said laser comprising:
   a laser oscillator for providing an applied laser pulse of relatively Gaussian shape;
   a polarizing beamsplitter;
   a plasma switch disposed between the laser oscillator and the polarizing beamsplitter along an oscillating path and having a predetermined plasma confined therein at a predetermined pressure specifically set for truncating a predetermined rear portion of the applied laser pulse;
   a phase conjugate mirror having a nonlinear medium therein confined at a predetermined pressure specifically set for truncating a predetermined front portion of an applied laser pulse;
   an amplifying medium disposed between the polarizing beamsplitter and the phase conjugate mirror along an amplifying path;
   a controllable delay line disposed along the amplifying path that cooperates with the plasma switch to truncate the rear portion of the applied laser pulse; and
   a quarter wave plate disposed along the amplifying path and adapted to rotate the polarization of an applied laser pulse.

2. A phase conjugated laser comprising:
   a laser oscillator;
   a phase conjugate mirror having a nonlinear medium therein confined at a predetermined pressure specifically set for truncating a predetermined front portion of an applied laser pulse;
   an amplifying medium disposed between the laser oscillator and the phase conjugate mirror for amplifying an applied laser pulse;
   a plasma switch disposed between the laser oscillator and the amplifier and having a predetermined plasma confined therein at a predetermined pressure specifically set for truncating a predetermined rear portion of the laser pulse to produce a laser pulse having a relatively square shape.

3. A phase conjugate laser comprising:
   a laser oscillator;
   a phase conjugated mirror having a nonlinear medium therein confined at a predetermined pressure specifically set for truncating the front portion of an applied laser pulse;

an amplifying medium disposed between the laser oscillator and the phase conjugate mirror for amplifying an applied laser pulse;

a plasma switch disposed between the laser oscillator and the amplifier and having a predetermined plasma confined therein at a predetermined pressure specifically set for truncating the rear portion of the laser pulse to produce a laser pulse having a relatively square shape;

wherein the relative pressures employed in the phase conjugate mirror and plasma switch are determinative of the truncation of the laser pulse transmitted from the oscillator to the phase conjugate mirror and back, and which produces the laser pulse having a relatively square shape.

4. A method of forming a square laser pulse in a master oscillator power amplifier laser system, said method comprising the steps of:

adjusting the pressure in a phase conjugate mirror to truncate the front portion of a laser pulse;

adjusting the pressure in a plasma switch to a predetermined pressure to truncate the rear portion of a laser pulse at a predetermined time;

propagating a laser pulse through the plasma switch and an amplifier to amplify the laser pulse;

reflecting the amplified laser pulse from a phase conjugate mirror.

5. A method of forming a relatively square laser pulse from a relatively Gaussian laser pulse, said method comprising the steps of:

adjusting the pressure in a plasma switch to a predetermined pressure to truncate the rear portion of a laser pulse;

adjusting the pressure in a phase conjugate mirror to a predetermined pressure to truncate the front portion of a laser pulse;

transmitting a laser pulse having a relatively Gaussian pulse shape through the plasma switch;

transmitting the truncated laser pulse through a laser amplifier to amplify the laser pulse;

reflecting the amplified laser pulse from a phase conjugate mirror.

6. A method of forming a relatively square laser pulse from a relatively Gaussian laser pulse, said method comprising the steps of:

adjusting the pressure in a phase conjugate mirror to a predetermined pressure to truncate the front portion of a laser pulse;

transmitting a laser pulse having a relatively Gaussian pulse shape through a plasma switch and a laser amplifier to amplify the laser pulse;

reflecting the amplified laser pulse from the phase conjugate mirror;

applying the truncated laser pulse to a plasma switch;

adjusting the relative length of a delay line disposed between the amplifier and the phase conjugate mirror to truncate the rear portion of the laser pulse in the plasma switch.

7. A method of forming a relatively square laser pulse from a relatively Gaussian laser pulse, said method comprising the steps of:

adjusting the pressure in a plasma switch to a predetermined pressure to truncate the rear portion of a laser pulse;

adjusting the pressure in a phase conjugate mirror to a predetermined pressure to truncate the front portion of a laser pulse;

transmitting a laser pulse having a relatively Gaussian pulse shape through the plasma switch;

transmitting the truncated laser pulse through a laser amplifier to amplify the laser pulse;

reflecting the amplified laser pulse from a phase conjugate mirror;

adjusting the relative length of a delay line disposed between the amplifier and the phase conjugate mirror to assist in truncating the rear portion of the laser pulse in the plasma switch.

8. The method of claim 4 which further comprises the step of:

adjusting the relative length of a delay line disposed between the amplifier and the phase conjugate mirror to assist in truncating the rear portion of the laser pulse.

9. The method of claim 4 wherein the step of adjusting the pressure in the phase conjugate mirror comprises the step of:

employing a phase conjugate mirror comprising methane; and adjusting the pressure in the mirror to a pressure of about 1000 pounds per square inch.

10. The method of claim 4 wherein the step of adjusting the pressure in the phase conjugate mirror comprises the step of:

employing a phase conjugate mirror comprising nitrogen; and adjusting the pressure in the mirror to a pressure of about 2000 pounds per square inch.

11. The method of claim 5 which further comprises the step of:

adjusting the relative length of a delay line disposed between the amplifier and the phase conjugate mirror to assist in truncating the rear portion of the laser pulse in the plasma switch at a predetermined time.

12. The method of claim 5 wherein the step of adjusting the pressure in the phase conjugate mirror comprises the step of:

employing a phase conjugate mirror comprising methane; and adjusting the pressure in the mirror to a pressure of about 1000 pounds per square inch.

13. The method of claim 5 wherein the step of adjusting the pressure in the phase conjugate mirror comprises the step of:

employing a phase conjugate mirror comprising nitrogen; and adjusting the pressure in the mirror to a pressure of about 2000 pounds per square inch.

* * * * *

UNITED STATES PATENT AND TRADEMARK OFFICE
CERTIFICATE OF CORRECTION

PATENT NO.  : 4,972,156

DATED       : November 20, 1990

INVENTOR(S) : Eduard Gregor, et al

It is certified that error appears in the above-identified patent and that said Letters Patent is hereby corrected as shown below:

Correct FIG.1 as shown below.

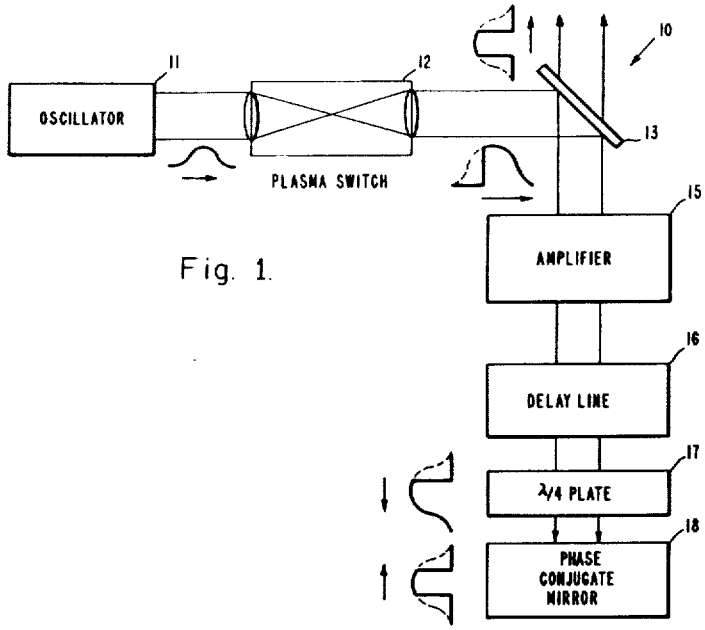

Fig. 1.

Signed and Sealed this

Thirteenth Day of October, 1992

*Attest:*

DOUGLAS B. COMER

*Attesting Officer*   *Acting Commissioner of Patents and Trademarks*